United States Patent
Jäger et al.

(10) Patent No.: US 11,809,606 B2
(45) Date of Patent: Nov. 7, 2023

(54) METHOD FOR MONITORING THE INTEGRITY OF A PHYSICAL OBJECT

(71) Applicant: UNISCON UNIVERSAL IDENTITY CONTROL GMBH, Munich (DE)

(72) Inventors: Hubert Jäger, Pullach (DE); Andreas Würl, Munich (DE); Christos Karatzas, Munich (DE)

(73) Assignee: UNISCON UNIVERSAL IDENTITY CONTROL GMBH, Munich (DE)

( * ) Notice: Subject to any disclaimer, the term of this patent is extended or adjusted under 35 U.S.C. 154(b) by 353 days.

(21) Appl. No.: 17/348,404

(22) Filed: Jun. 15, 2021

(65) Prior Publication Data
US 2021/0312087 A1 Oct. 7, 2021

Related U.S. Application Data

(63) Continuation of application No. PCT/EP2019/083458, filed on Dec. 3, 2019.

(30) Foreign Application Priority Data

Dec. 19, 2018 (DE) .......... 10 2018 132 996

(51) Int. Cl.
*G06F 21/64* (2013.01)
*G06F 21/73* (2013.01)
*H04L 9/08* (2006.01)

(52) U.S. Cl.
CPC .............. *G06F 21/64* (2013.01); *G06F 21/73* (2013.01); *H04L 9/0825* (2013.01); *H04L 9/0891* (2013.01)

(58) Field of Classification Search
CPC .......... G06F 21/64; G06F 21/73; G06F 21/86; H04L 9/0825; H04L 9/0891; H04L 9/3247; H04L 9/3278
See application file for complete search history.

(56) References Cited

U.S. PATENT DOCUMENTS

| | | | |
|---|---|---|---|
| 2004/0001568 A1* | 1/2004 | Impson | G06Q 10/08 378/60 |
| 2007/0044139 A1* | 2/2007 | Tuyls | G06V 40/10 726/2 |

(Continued)

FOREIGN PATENT DOCUMENTS

| | | |
|---|---|---|
| EP | 3 101 586 A1 | 12/2016 |
| EP | 3101586 A | 12/2016 |

(Continued)

OTHER PUBLICATIONS

Examination report issued by The Patent Office of India for Indian Patent Application No. 202117030707, dated Jun. 3, 2022 with English translation.

(Continued)

*Primary Examiner* — Harunur Rashid
(74) *Attorney, Agent, or Firm* — MYERS WOLIN, LLC

(57) ABSTRACT

A method is provided for monitoring the integrity of a physical object, wherein the object receives a request of a server via a communication network. The request includes a digital character string, and in response to the received request, an electronic system of the object ascertains the digital fingerprint of the object and combines the ascertained digital fingerprint with a digital secret, which is known to the server and is stored in a memory device, and with the received character string (C) in order to form a response. The object transmits the response to the server via the communication network for analysis.

17 Claims, 2 Drawing Sheets

(56) References Cited

U.S. PATENT DOCUMENTS

2008/0256600 A1* 10/2008 Schrijen ............... H04L 9/3218
726/2
2016/0359825 A1* 12/2016 Chand .................... G06F 21/64
2022/0277261 A1* 9/2022 Stollman ............... G06Q 10/08

FOREIGN PATENT DOCUMENTS

| WO | 2004/104899 | A2 | 12/2004 |
| WO | 2004104899 | A2 | 12/2004 |
| WO | 2007/031908 | A2 | 3/2007 |
| WO | 2007031908 | A2 | 3/2007 |

OTHER PUBLICATIONS

International Search Report issued for corresponding International Application No. PCT/EP2019/083458 dated Feb. 19, 2020.

* cited by examiner

METHOD FOR MONITORING THE INTEGRITY OF A PHYSICAL OBJECT

CROSS REFERENCE TO RELATED APPLICATIONS

This application is a continuation of International Application No. PCT/EP2019/083458, filed on Dec. 3, 2019, which takes priority from German Patent Application No. 10 2018 132 996.2, filed Dec. 19, 2018, the contents of each of which are incorporated by reference herein.

TECHNICAL FIELD

The invention relates to a method for monitoring the integrity of a physical object and to a physical object which is designed such that its integrity can be monitored.

BACKGROUND

Certain physical objects must be periodically inspected to check their integrity. "Physical objects" will hereinafter be referred to simply as "objects." Such checks may be necessary due to legal requirements, for example. In certain cases, checks of this kind must or should be carried out by independent institutions, such as inspection bodies. For example, an inspection body can be commissioned to check the waste gas sensors of a CHP plant at regular intervals, for example annually, in order to check the integrity of the waste gas sensors, among other things. The aim of such integrity checks is to determine whether the object to be checked has been manipulated.

An integrity check can be carried out for a large number of different objects other than sensors. The invention is explained below using a sensor as an example.

In a conventional periodic inspection, an on-site inspector must visually inspect the sensor and attach a conventional seal. If the sensor is connected to a sensor gateway, the inspector can also check the connection of the sensor to the sensor gateway and satisfy himself as to the reliability and integrity of the sensor gateway. When the inspector arrives for the next periodic inspection, he can infer the integrity of the sensor from the intactness of the seal. In the case of the sensor gateway, aside from assumptions about external appearance, he has few or no indications as to the integrity of the sensor gateway.

A sensor gateway of this kind can be provided if the sensor data have to be transmitted to an external location or to a central data processing device where they can be evaluated, for example, in order to detect sensor values lying outside a normal range.

Such periodic inspections or checks have the disadvantage, however, that between two inspections the operator of the sensor can manipulate the sensor or even replace it with another sensor. Exchange or manipulation of this kind would only be discovered by the inspector during the next inspection.

The sensor gateway via which the sensor data is forwarded to the external location or to the data processing device could also be manipulated. By manipulating the sensor gateway, the operator of the sensor could manipulate the sensor data in such a way that manipulated sensor data would be forwarded to the external location or to the data processing device. Manipulation of the sensor gateway is also difficult or impossible for the inspector to detect.

A problem addressed by the present disclosure is therefore that of providing solutions which allow continuous monitoring of physical objects in order to also allow continuous checking of the integrity thereof. In this way, manipulations of the object should be detected promptly, preferably in real time, without an inspector having to visually inspect the object on site.

SUMMARY

This problem is solved by a method for monitoring the integrity of a physical object and by an object which is designed such that its integrity can be monitored according to the independent claims.

A method for monitoring the integrity of a physical object is thus provided, wherein
- the object is suitable for communicating with a server via a communication network,
- a unique identifier is assigned to the object,
- predetermined physical properties of the object form a digital fingerprint of the object, and
- the object has an electronic system comprising a memory device, wherein the electronic system is suitable for ascertaining the digital fingerprint of the object on request, and wherein
- the object receives a request from the server via the communication network, said request comprising a digital character string,
- the electronic system of the object
- ascertains the digital fingerprint of the object in response to the received request,
- combines the ascertained digital fingerprint with a digital secret, which is known to the server and is stored in the memory device, and with the received character string in order to form a response, and
- the object transmits the response to the server via the communication network for analysis.

A private cryptographic key can be stored in the memory device of the electronic system, the response being signed with this private key before it is transmitted to the server.

A public cryptographic key of the server can be stored in the memory device of the electronic system, the response being encrypted with this public key before it is transmitted to the server.

The digital secret and/or the private key can be stored securely and confidentially in the memory device of the electronic system.

It is advantageous for the object to be coupled to an object gateway, the object gateway being coupled to the communication network, and the object communicating with the server via the object gateway and the communication network.

The object gateway can receive the response from the object, sign the received response with a private cryptographic key assigned to the object gateway, and forward the thus-signed response to the server.

It is advantageous for the electronic system to be suitable for detecting manipulations of the electronic system, and, if manipulation of the electronic system is detected, to delete the digital secret and/or the private key in the memory device.

It is advantageous for the object to continuously receive requests from the server, the digital character string of the request changing over time, preferably with each request.

It is also advantageous for the object to be at least partially encased in a sheet, with a number of electrically conductive strip conductors which are or can be coupled to the electronic system of the object being arranged in the sheet, and physical properties of the strip conductors forming the digital fingerprint of the object.

It is also advantageous for the physical properties of the strip conductors to include a conductance of the strip conductors and an electrical capacitance between the strip conductors.

It is advantageous for the sheet to be arranged on the object or for the strip conductors to extend in the sheet in such a way that manipulation of the object is not possible without changing the physical properties of the strip conductors.

After attaching the sheet to the object and before receiving a request for the first time, the physical properties of the strip conductors can be ascertained and the ascertained physical properties can be transmitted to the server as a digital fingerprint together with an identifier of the object.

It is advantageous for the digital fingerprint, together with the identifiers of the object, to be transmitted to the server via a communication channel that is different from the communication channel via which the object receives the request from the server or via which the object transmits the response to the server.

The server can be operated in a sealed environment.

A physical object is also provided, wherein
the object is suitable for communicating with a server via a communication network,
predetermined physical properties of the object form a digital fingerprint of the object, and
the object has an electronic system comprising a memory device, wherein the electronic system is suitable for ascertaining the digital fingerprint of the object on request,
the object is suitable for receiving a request via the communication network, said request comprising a digital character string,
the electronic system of the object is suitable for
ascertaining the digital fingerprint of the object in response to the received request,
combining the ascertained digital fingerprint with a digital secret, which is stored in the memory device, and with the received character string in order to form a response, and
the object is also suitable for transmitting the response to the server via the communication network for analysis.

A private cryptographic key can be stored in the memory device of the electronic system, the electronic system being suitable for signing the response with this private key before it is transmitted to the server.

It is advantageous if a public cryptographic key of the server can be stored in the memory device of the electronic system, the electronic system being suitable for encrypting the response with this public key before it is transmitted to the server.

A sheet can be arranged on the object, with a number of electrically conductive strip conductors which are or can be coupled to the electronic system of the object being arranged in the sheet, and physical properties of the strip conductors forming the digital fingerprint of the object.

It is advantageous for the physical properties of the strip conductors to include a conductance of the strip conductors and an electrical capacitance between the strip conductors.

It is advantageous for the sheet to be arranged on the object or for the strip conductors to extend in the sheet in such a way that manipulation of the object is not possible without changing the physical properties of the strip conductors.

BRIEF DESCRIPTION OF THE DRAWINGS

Details and features of the invention and specific embodiments of the invention can be found in the following description in conjunction with the drawings. The invention is not limited to the embodiments described below. In the drawings.

DETAILED DESCRIPTION

The method according to this disclosure is described in more detail using the example of a sensor, which is a physical object within the meaning of the present disclosure. However, the method can be used for other physical objects in order to ascertain or determine the integrity of the physical objects.

Figure 1:
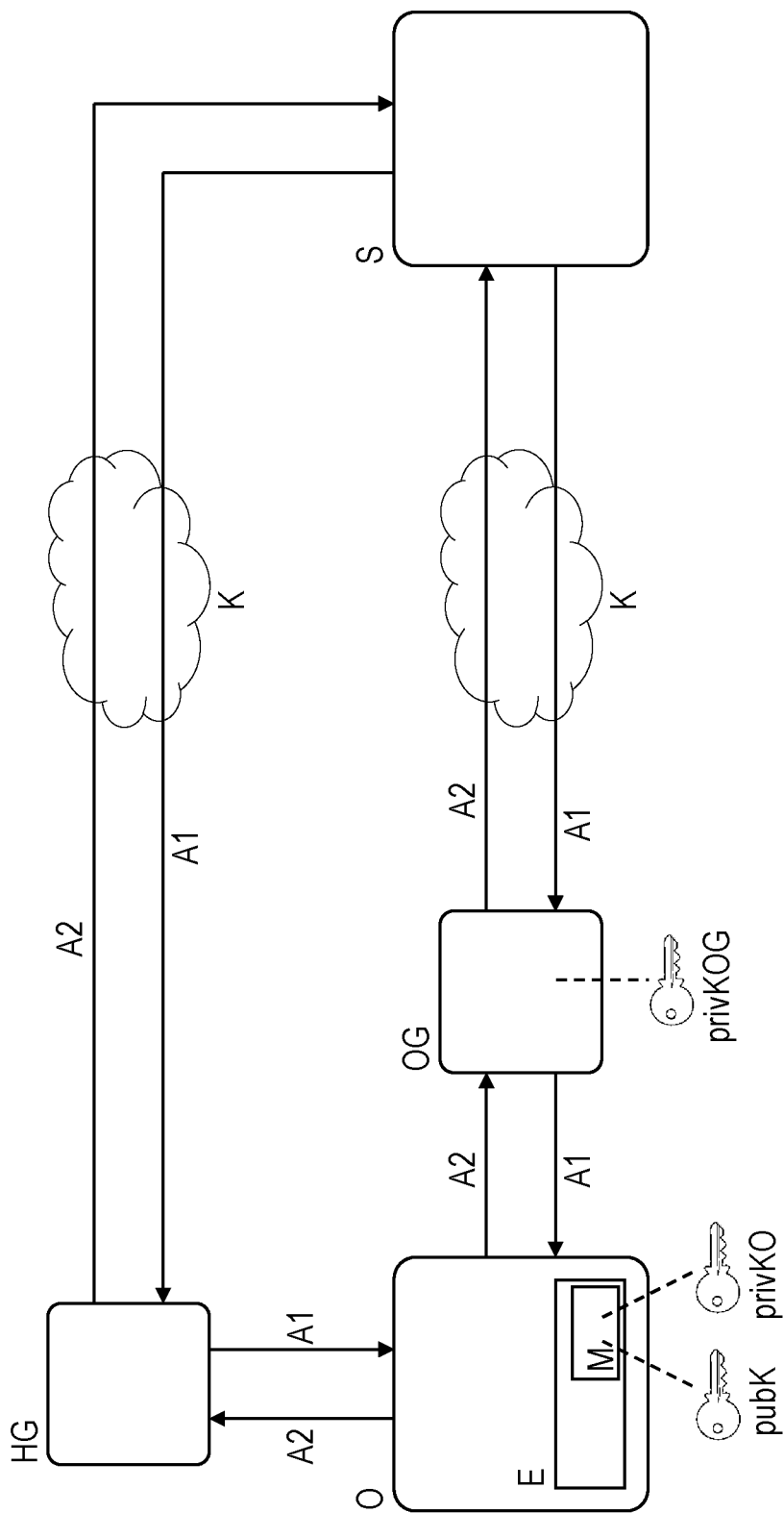
FIG. 1 is a block diagram of a system by means of which a method according to the invention is explained.

FIG. 1 shows a block diagram of a system in which a sensor O (=physical object) is integrated. The sensor O is continuously monitored to validate the integrity of the sensor.

"Continuously" means that it is checked periodically, preferably at short time intervals, whether the sensor has been manipulated and thus whether the integrity of the sensor is no longer ensured. As a result, manipulation of the sensor can largely be detected in real time. "Real time" in this context means that a manipulation is detected promptly after the manipulation. For example, if a sensor only delivers a measured value every 7 days, the "real time" condition can still be fulfilled if manipulation is detected within seven days—in this case, the last measured value could be rejected as invalid or unreliable because the reliability of the measured value can no longer be guaranteed due to the detected manipulation.

There may be manipulation of the sensor if the sensor has been replaced (e.g. improperly) or the sensor has been mechanically manipulated in some other way, for example.

In the example shown in FIG. 1, the sensor O is coupled to an object gateway OG, which is designed here as a sensor gateway OG. The sensor O communicates via the sensor gateway OG and via a communication network K with a server S. In a particular embodiment of the invention, the sensor S can also communicate with the server without the sensor gateway OG, provided that the sensor SO is adapted accordingly.

The server S is suitable for monitoring the integrity of the sensor O. An inspection of the sensor O on site by an inspector can thus be omitted. A significant advantage, however, is that the integrity of the sensor O can be continuously monitored in this way, if necessary at very short time intervals, for example every hour, every minute, or even smaller time intervals. This also makes it possible to monitor the integrity of physical objects which previously could not be monitored due to the small time intervals.

In addition to the actual sensor electronic system, the sensor O has a further electronic system E, which in turn has a memory device M or which is coupled to a memory device M. The electronic system E is suitable for ascertaining a digitizable fingerprint of the sensor. The digitizable fingerprint of the sensor is designed in such a way that manipulation of the sensor results in a change in this fingerprint, so that the server S can use the fingerprint to detect a manipulation of the sensor O and thus a violation of the integrity of the sensor O.

The fingerprint of the sensor O can, for example, be derived from predetermined physical properties of the sensor, or predetermined physical properties of the sensor can form the fingerprint of the sensor. For example, electrical strip conductors can be integrated in a housing of the sensor O, the electrical capacitance between the strip conductors being characteristic of the specific sensor, so that the electrical capacitance between the strip conductors can be used as a fingerprint of the sensor. A manipulation of the housing would result in a change in this capacitance, which is characteristic of the sensor, and thus also in a change in the fingerprint.

In another example, resistance elements could be arranged inside the sensor, with manipulation of the sensor resulting in a change in the resistance value characteristic of this sensor. In yet another example, the inside of the sensor housing could be subjected to a negative or positive pressure that is characteristic of the specific sensor, so that manipulations of the sensor result in a change in the negative or positive pressure and thus in a change in the fingerprint. These physical properties can also be combined such that the fingerprint is formed by a combination of these physical properties and a change in one of these physical properties results in a change in the characteristic fingerprint.

For the sensor O to be monitored by the server S, i.e. for the server to be able to monitor the integrity of the sensor, the sensor O must be integrated into the inventory (=amount of objects to be monitored) to be monitored by the server S. That is, the sensor must be made known to the server, typically during or directly after the installation of the sensor by an inspector who is preferably trusted by the operator of the server.

Inventorying of the Physical Object

After the installation/assembly of the sensor O, the inspector can read out the fingerprint of the sensor O with a handheld device HG. For this purpose, the inspector can connect the handheld device HG to the electronic system E (in either a wired or wireless manner, which ultimately depends on the specific design of the sensor). At the request of the handheld device, the electronic system can then ascertain the physical properties characteristic of the sensor and transfer these to the handheld device as the fingerprint of the sensor. The electronic system E of the sensor O can also transmit an identifier of the sensor, which can be stored in the memory M, to the handheld device HG. The identifier of the sensor can, however, also be generated by the handheld device and transmitted to the electronic system of the sensor. Communication between the handheld device and the sensor can be encrypted.

In one embodiment of the invention, a cryptographic key pair privKO, pubK that is individually assigned to the sensor is stored in the memory device M of the electronic system E. The electronic system E can transmit the public cryptographic key pubK to the handheld device HG. The private cryptographic key privKO of the sensor O is stored in the memory M of the electronic system E in a confidential and tamper-proof manner.

The cryptographic key pair can be generated during production of the sensor O and stored in the memory M of the sensor.

Alternatively, the cryptographic key pair can also be generated by the handheld device HG during inventorying of the sensor O. In this case, the handheld device HG transmits the key pair (but at least the private key privKO) to the sensor O, where it is stored in the memory M. The public key pubK then no longer has to be transmitted from the electronic system E to the handheld device HG. The key pair can also be transmitted in encrypted form.

After the identifier of the sensor and the digital fingerprint (and optionally the public key pubK of the sensor O) are available in the handheld device, these data are transmitted from the handheld device HG to the server S (preferably encrypted). The data to be transmitted to the server can be signed by the handheld device HG so that the server can check the integrity of the transmitted data.

The server stores these data and assigns the fingerprint and optionally the public key pubK of the sensor to the identifier of the sensor.

In an alternative embodiment of the invention, the inventorying of a physical object O can also be carried out by the object gateway OG. However, the object gateway OG cannot determine whether a new object to be inventoried is actually a new object or an object that has been connected (e.g. with fraudulent intent) to the object gateway instead of an object that has already been inventoried. It is therefore advantageous for the inventorying to be carried out by an inspector with a handheld device.

This server S can now monitor the sensor or the integrity thereof.

Monitoring the Integrity of the Physical Object

In order to check the integrity of the sensor O, the server S first generates a character string that is individual for this check. This individual character string is sent to the sensor O as a request A1 addressed to the sensor O. The address of the sensor O can be made known to the server S as part of the aforementioned inventorying, for example by the handheld device HG transmitting the address to the server S together with the other data. The address can be an IPv4 or IPv6 address, for example. Optionally, the server S can encrypt the request A1 with the public key pubK of the sensor O. It is advantageous for the server to generate a new character string for each request A1.

The sensor O receives the request A1 and decrypts the request A1 if necessary.

With the request A1, the sensor O or the electronic system E of the sensor is requested to notify the server of the digital fingerprint of the sensor.

For this purpose, the electronic system E of the sensor O ascertains the current fingerprint at the time of the request from the predetermined physical properties of the sensor. The digital form of the fingerprint of the sensor is then combined by the electronic system of the sensor with the received character string and with a secret known to the server. This combination forms a response A2, which is sent from the sensor O or from the electronic system E to the server. It is advantageous if the response A2 is encrypted before transmission.

The secret can be stored in the memory M of the electronic system E in a confidential and tamper-proof manner. The public key of the server required to encrypt the response can also be stored in the memory M of the electronic system.

The secret can be generated as part of the inventorying and stored in the memory of the M of the electronic system. In one embodiment, the secret can be generated by the handheld device HG and transmitted both to the sensor and to the server. The server can then assign the secret to the corresponding sensor identifier. Alternatively, the secret can also be generated by the server or by the sensor itself. The secret is then transmitted from the server to the sensor or from the sensor to the server.

The public key of the server S can also be transmitted to the sensor via the handheld device HG as part of the inventorying.

It is also advantageous if the response A2 is signed before it is transmitted to the server S, preferably with the private key privKO of the sensor O stored in the memory M. The server can thus verify the integrity of the response A2.

So that the server S can also use the response A2 to check whether the sensor O is connected to a specific sensor gateway OG (if a connection of the sensor to a sensor gateway is provided), the sensor gateway OG can sign the response A2 before forwarding it to the server S with its private key privOG. The reason for this is that a sensor can be connected to another sensor gateway without the fingerprint of the sensor changing, and the sensor can still be correctly addressed by the server. However, the connection of a sensor to another sensor gateway can also be a manipulation of the sensor, which should be recognized by the server if necessary.

The server S checks the signature of the sender (=sensor) for the received response A2 and, if necessary, the signature of the sensor gateway in order to determine the integrity of the response A2.

The server can now combine the fingerprint stored for this sensor during the inventorying with the shared secret and the character string that the server sent to the sensor with the request A1, and encrypt this combination with its public key, which the sensor also uses to encrypt the response A2. If the result of this encryption is identical to the encrypted response A2, then the fingerprint transmitted with the encrypted response A2 is also identical to the fingerprint stored for this sensor in the server, and therefore the integrity of the sensor is ascertained. The identity of the sensor is also verified in this way.

Alternatively, the server can decrypt the received response A2, since it was encrypted by the sensor with the public key of the server. The fingerprint can then be extracted from the decrypted response A2 and compared with the fingerprint stored for this sensor in the server.

In an alternative embodiment of the invention, the checking or testing of the integrity of the sensor can also be carried out via the handheld device HG. In this case, the handheld device can take over the task of the sensor gateway OG, i.e. receive the response A2 from the sensor, sign it with the private key of the handheld device and transmit the signed response A2 to the server.

Checking integrity with the handheld device is particularly advantageous if the sensor is not able or not designed to communicate with the server. The handheld device can then connect to the sensor, as a result of which the electronic system of the sensor can transmit the fingerprint, the secret and the private key privKO of the sensor to the handheld device. The handheld device HG can then request the request A1 for this sensor from the server S, whereupon the server generates the request A1 for this sensor and transmits it to the handheld device. The handheld device can then combine the fingerprint received from the sensor O with the secret received from the sensor O and with the character string received from the server S, and sign the combination with the private key privKO of the sensor. The response A2 obtained in this way can then be signed by the handheld device with its private key and transmitted to the server.

Checking integrity with the handheld device is also advantageous if the sensor only has an inactive electronic system E, which, however, can be supplied with electrical current from the handheld device HG. After connecting the handheld device to the sensor, the electronic system E of the sensor is activated. The integrity check can then be carried out as described above.

According to the invention, it is also possible to use a method according to the invention to continuously monitor sensors which inherently have no characteristic physical features or for which no characteristic physical features which can then be used to derive a fingerprint can be derived. In this case, the sensor O is provided with a self-curing sheet. The entire sensor or parts of the sensor can be covered with this sheet. The sheet has a large number of electrical strip conductors. After the sheet has been placed on the sensor, it is cured, as a result of which the capacitance between the strip conductors is set to a value that is characteristic of the cured shape of the sheet, for example. A fingerprint for the sensor O can then be derived from the capacitances, which is then made known to the server for this sensor as part of the inventorying. Subsequent changes to the cured sheet (e.g. partially removing or damaging the sheet) result in a change in the characteristic capacitances and thus in a change in the fingerprint of the sensor.

The sheet can be coupled to an active electronic system, which in this case takes on the tasks described in the example of a sensor above.

Alternatively, the sheet can also be coupled to electronic system E, which is supplied with electrical power by a handheld device HG, for example.

Instead of a sheet, other measures can also be provided with which a sensor can be retrofitted and with which a change in a fingerprint characteristic of the sensor, i.e. a manipulation, can be ascertained.

The server S itself is part of a sealed infrastructure (sealed environment).

The sealed infrastructure substantially comprises encapsulated zones or segments of a data center which are protected by special measures. Such measures can be, for example, special rooms with special security doors. In addition, a network of sensors can be provided by means of which the sealed infrastructure is protected so that unauthorized access is not possible, either physically on site or logically via an electronic interface, without triggering an alarm. External access to the data stored in the sealed infrastructure is only permitted via a few very special interfaces, these interfaces also being monitored with special filters in order to detect attempted attacks via these few special interfaces.

The server of the sealed infrastructure stores the private keys of the server, the fingerprints transferred to the server as part of the inventorying, the assignment of these fingerprints to the respective physical objects, and the secret of the server. It is advantageous if this data is stored exclusively in a volatile memory of the server. If unauthorized access to the server is detected, the power supply to the volatile memory can be interrupted, so that all data stored in the volatile memory are deleted immediately. The content of the volatile memory is preferably replicated via certain specially secured communication links to a backup server, which in turn is part of a sealed infrastructure. After the volatile memory of the server S has been cleared, the content of the volatile memory can be restored without having to carry out inventorying again.

Figure 2:
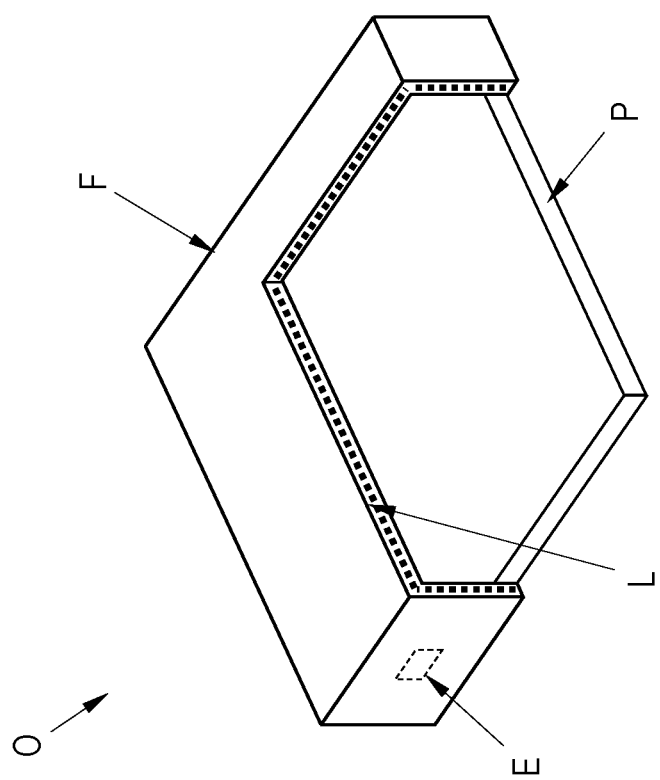
FIG. 2 shows an example of a physical object according to the invention, using the example of a sensor.

FIG. 2 shows an example of a physical object O according to the invention, using the example of a sensor.

The sensor O here consists substantially of a printed circuit board P on which sensor-specific electrical components (not shown here) are arranged. A sheet F, which has a large number of electrical strip conductors L, is arranged around the sensor housing (not shown here). The electrical strip conductors L are embedded in the sheet. The electrical strip conductors L are also connected to the electronic system E, which is suitable here for measuring the capacitances between the strip conductors L and deriving a fingerprint characteristic of the sensor O therefrom. The electronic system E can be integrated in the sheet F, for example as an ASIC or as a die. Alternatively, the electronic system can also be arranged on the printed circuit board P.

As explained above, the electronic system can be designed as active electronic system or as passive electronic system, with the passive electronic system being supplied with electrical energy by the handheld device.

A special interface can be provided for connecting the handheld device to the electronic system (for power supply and/or for data exchange). Alternatively, the electronic system can also communicate wirelessly with the handheld device, which is particularly advantageous when both electronic systems are active electronic systems, i.e. electronic systems that do not have to be supplied with electrical energy by the handheld device.

The sheet F can be a curable sheet which is cured after being attached to the sensor and thus receives its final shape. Due to the shape obtained by the curing process, capacitances characteristic of this shape are established between the strip conductors, which serve as the basis for the fingerprint. A sensor fingerprint obtained in this way is practically impossible to reproduce.

The sheet can be attached to the sensor by an inspector who inventories the sensor. Alternatively, the sheet can be arranged on the sensor during the manufacture of the sensor. In this case, the sheet does not necessarily have to be attached to the sensor housing, and can also be attached inside the housing.

REFERENCE SIGNS

A1 request
A2 response to request A1
E electronic system
F sheet, preferably self-curing
GH handheld device
K communication network
L electrical strip conductors
M memory device of the electronic system or coupled to the electronic system
O object (the integrity of which is to be checked/monitored), e.g. a sensor
OG object gateway, e.g. a sensor gateway
P printed circuit board of the sensor
privKO private cryptographic key of the object O
privKOG private cryptographic key of the object gateway OG
pubK public cryptographic key of the object O
S server

What is claimed is:

1. A method for monitoring the integrity of a physical object (O), wherein
the object (O) is suitable for communicating with a server (S) via a communication network (K),
the object (O) is assigned a unique identifier,
predetermined physical properties of the object (O) form a digital fingerprint (FP) of the object, and
the object (O) has an electronic system (E) comprising a memory device (M), wherein the electronic system is suitable for ascertaining the digital fingerprint (FP) of the object (O) on request,
and wherein
the object (O) receives a request (A1) from the server (S) via the communication network (K), said request comprising a digital character string (C),
the electronic system of the object (O)
ascertains the digital fingerprint (FP) of the object in response to the received request (A1),
combines the ascertained digital fingerprint (FP) with a digital secret (G), which is known to the server and is stored in the memory device, and with the received character string (C) in order to form a response (A2), and the received character string (C) in order to form a response (A2), and
the object transmits the response (A2) to the server (S) via the communication network (K) for analysis,
wherein the object (O) is at least partially encased in a sheet, wherein a number of electrically conductive strip conductors which are coupled to the electronic system of the object are arranged in the sheet, and wherein physical properties of the strip conductors form the digital fingerprint (FP) of the object, and
wherein, after the sheet is attached to the object and before a request (A1) is received for the first time, the physical properties of the strip conductors are ascertained and the ascertained physical properties are transmitted to the server as a digital fingerprint together with an identifier of the object.

2. The method of claim 1, wherein a private cryptographic key (privKO) is stored in the memory device of the electronic system, wherein the response (A2) is signed with this private key (privKO) before it is transmitted to the server (S).

3. The method of claim 2, wherein the digital secret (G) and/or the private key (privKO) are stored securely and confidentially in the memory device of the electronic system.

4. The method of claim 2, wherein the electronic system is suitable for detecting manipulations of the electronic system, and, if manipulation of the electronic system is detected, deletes the digital secret (G) and/or the private key (privKO) in the memory device.

5. The method of claim 1, wherein a public cryptographic key (pubK) of the server (S) is stored in the memory device of the electronic system, wherein the response (A2) is encrypted with this public key (pubK) before it is transmitted to the server (S).

6. The method of claim 1, wherein the object (O) is coupled to an object gateway (OG), wherein the object gateway (OG) is coupled to the communication network (K), and wherein the object (O) communicates with the server (S) via the object gateway (OG) and the communication network (K).

7. The method of claim 6, wherein the object gateway (OG) receives the response (A2) from the object (O), signs the received response (A2) with a private cryptographic key (privKOG) assigned to the object gateway (OG), and forwards the thus-signed response to the server.

8. The method of claim 1, wherein the object (O) continuously receives requests (A1) from the server (S), wherein the digital character string (C) of the request changes over time, preferably with each request.

9. The method of claim 1, wherein the physical properties of the strip conductors include a conductance of the strip conductors and an electrical capacitance between the strip conductors.

10. The method of claim 1, wherein the sheet is arranged on the object or the strip conductors extend in the sheet in such a way that manipulation of the object is not possible without changing the physical properties of the strip conductors.

11. The method of claim 1, wherein the digital fingerprint, together with the identifiers of the object, is transmitted to the server via a communication channel that is different from the communication channel via which the object receives the request (A1) from the server (S) or via which the object transmits the response (A2) to the server (S).

12. The method of claim 1, wherein the server is operated in a sealed environment.

13. A physical object (O), wherein
the object (O) is suitable for communicating with a server (S) via a communication network (K),
predetermined physical properties of the object (O) form a digital fingerprint (FP) of the object, and
the object (O) has an electronic system (E) comprising a memory device (M), wherein the electronic system is suitable for ascertaining the digital fingerprint (FP) of the object (O) on request,
the object (O) is suitable for receiving a request (A1) via the communication network (K), wherein the request comprises a digital character string (C),
the electronic system of the object (O) is adapted
to ascertain the digital fingerprint (FP) of the object in response to the received request (A1),
to combine the ascertained digital fingerprint (FP) with a digital secret (G), which is stored in the memory device, and with the received character string (C) in order to form a response (A2), and
the object is additionally suitable for transmitting the response (A2) to the server (S) via the communication network (K) for analysis,
wherein the object (O) is at least partially encased in a sheet, wherein a number of electrically conductive strip conductors which are coupled to the electronic system of the object are arranged in the sheet, and wherein physical properties of the strip conductors form the digital fingerprint (FP) of the object, and
wherein, after the sheet is attached to the object and before a request (A1) is received for the first time, the physical properties of the strip conductors are ascertained and the ascertained physical properties are transmitted to the server as a digital fingerprint together with an identifier of the object.

14. The object of claim 13, wherein a private cryptographic key (privKO) stored in the memory device of the electronic system, wherein the electronic system is suitable for signing the response (A2) with this private key (privKO) before it is transmitted to the server (S).

15. The object of claim 13, wherein a public cryptographic key (pubK) of the server (S) stored in the memory device of the electronic system, wherein the electronic system is suitable for encrypting the response (A2) with this public key (pubK) before it is transmitted to the server (S).

16. The object of claim 13, wherein the physical properties of the strip conductors include a conductance of the strip conductors and an electrical capacitance between the strip conductors.

17. The object of claim 13, wherein the sheet is arranged on the object or the strip conductors extend in the sheet in such a way that manipulation of the object is not possible without changing the physical properties of the strip conductors.

* * * * *